(12) United States Patent
Podal et al.

(10) Patent No.: US 9,973,500 B2
(45) Date of Patent: May 15, 2018

(54) SECURITY ARCHITECTURE FOR AUTHENTICATION AND AUDIT

(71) Applicant: Bank of America Corporation, Charlotte, NC (US)

(72) Inventors: Savitri Podal, Mumbai (IN); Sandhya Vanapalli, Mumbai (IN); Glenda Aranas, Agoura Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 179 days.

(21) Appl. No.: 15/131,106

(22) Filed: Apr. 18, 2016

(65) Prior Publication Data

US 2017/0302667 A1 Oct. 19, 2017

(51) Int. Cl.
*H04L 29/06* (2006.01)

(52) U.S. Cl.
CPC .......... *H04L 63/0892* (2013.01); *H04L 63/10* (2013.01)

(58) Field of Classification Search
CPC .............................. H04L 63/0892; H04L 63/10
USPC ............................................................. 726/4
See application file for complete search history.

(56) References Cited

U.S. PATENT DOCUMENTS

| 9,432,379 | B1 * | 8/2016 | Roche | H04L 63/08 |
| 9,503,452 | B1 * | 11/2016 | Kumar | H04L 67/306 |
| 2009/0099882 | A1 * | 4/2009 | Karabulut | G06Q 10/06 713/152 |
| 2009/0235349 | A1 * | 9/2009 | Lai | H04L 9/3213 726/14 |
| 2010/0269149 | A1 * | 10/2010 | Lee | G06Q 10/06 726/1 |
| 2012/0084850 | A1 * | 4/2012 | Novak | G06F 21/335 726/8 |
| 2014/0019752 | A1 * | 1/2014 | Yin | H04L 63/0435 713/155 |

OTHER PUBLICATIONS

"Getting A Look At Web Services," Dummies.com, John Wiley & Sons, Inc., Retrieved on Feb. 24, 2016.
"Web Service," Wikipedia.org, Wikimedia Foundation, Inc., Jan. 2, 2016.
"Security Token Service," PingIdentity.com, Ping Identity Corporation, Retrieved on Feb. 3, 2016.
"Security Assertion Markup Language," Wikipedia.org, Wikimedia Foundation, Inc., Dec. 27, 2015.

\* cited by examiner

*Primary Examiner* — Michael S McNally
(74) *Attorney, Agent, or Firm* — Weiss & Arons LLP; Michael A. Springs, Esq.

(57) ABSTRACT

A mechanism for consolidating communications between a computer tenant and a web services layer is provided. The mechanism may include a web services layer. The web services layer may be configured to receive communications, via an authentication validation module, from an authentication service. The authentication service may be in communication with the computer tenant and/or the web services layer. The web services layer may be configured to receive authorization data, via an authorization module, from an authorization data store. The web services layer may also receive and transmit logged calls from a log database. The logged calls may store calls from the computer tenant to the web services layer and calls from the web services layer to the authentication server. The computer tenant may initiate communication with the web services layer. Included in the communications may be a token.

19 Claims, 4 Drawing Sheets

SECURITY ARCHITECTURE FOR AUTHENTICATION AND AUDIT

FIELD OF TECHNOLOGY

Aspects of the invention relate to providing mechanism/apparatus to implement security in web services. In particular, the disclosure relates to implementing authentication, authorization and audit in web services by centralizing the architecture for security within the web services layer.

BACKGROUND OF THE DISCLOSURE

Large enterprises use a plurality of systems where the systems utilize various web services to create new applications and/or retrieve information from different systems of record or legacy applications. Application security is a concern as different applications use different security measures during integration.

Additionally, authentication, authorization and audit ("AAA") when building applications require dedicated AAA server or third party tools to be integrated with the web services layer.

This is not desirable because it involves additional layers of integration and increases the dependencies of other systems. Security costs and risk of information leakage are increased as well.

Therefore, it would be desirable to have a centralized architecture within the web services layer that will handle the combination of the AAA for each request.

SUMMARY OF THE INVENTION

A method for centralizing within a web services layer authentication, authorization and audit of user activity is provided. A user or a web application consumes the functionality provided by the web services.

A web services layer may be understood, for the purposes of the application, to be a software system for transmitting data over the internet/intranet and allowing programmatic access to that data using standard internet protocols. The web services layer may be added to a graphical user interface ("GUI") and may offer specific functionalities to users. Access to the web services layer may be enabled on the GUI using a web interface.

The method may involve receiving a user ID, a password, and/or ID token at the web services layer. The ID token may be registered with a Ping security token service ("STS"). The Ping STS may be in communication with the web services layer.

The web services layer may communicate the user ID, password and/or ID token to the Ping STS. In response to the Ping STS's receipt of the communication, the method may further involve using the Ping STS to generate a one-time security assertion markup language ("SAML") token. The SAML token may contain client identification and an associated privilege level of user access to operations at the web services layer. The privilege level may be based on information stored at the Ping STS related to identification. The SAML token may expire after a pre-determined time thereby preventing other-user access to the service via the same SAML token. The SAML token may also enable secure access to the web interface.

The method may further involve transmitting the SAML token to the web services layer. The web services layer may verify the SAML token and authenticate the user.

The method may further involve authorizing the requested user operation based on the privilege level incorporated in the SAML token. The authorizing may further include transmitting information about user identification ("userid") and access privileges from the SAML token to a central repository system ("CRS") in a simple object access protocol ("SOAP") message, and based on the privilege level, the CRS may confirm permissibility of the requested operation to the web services layer.

In certain embodiments, the web services layer may either authorize or deny the requested user operation.

The method may further involve logging a user's actions at the web services layer. The logging may further involve integrating a remote or third-party logging system with the web services layer. The logging system may enable searching and tracking of the user's actions.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
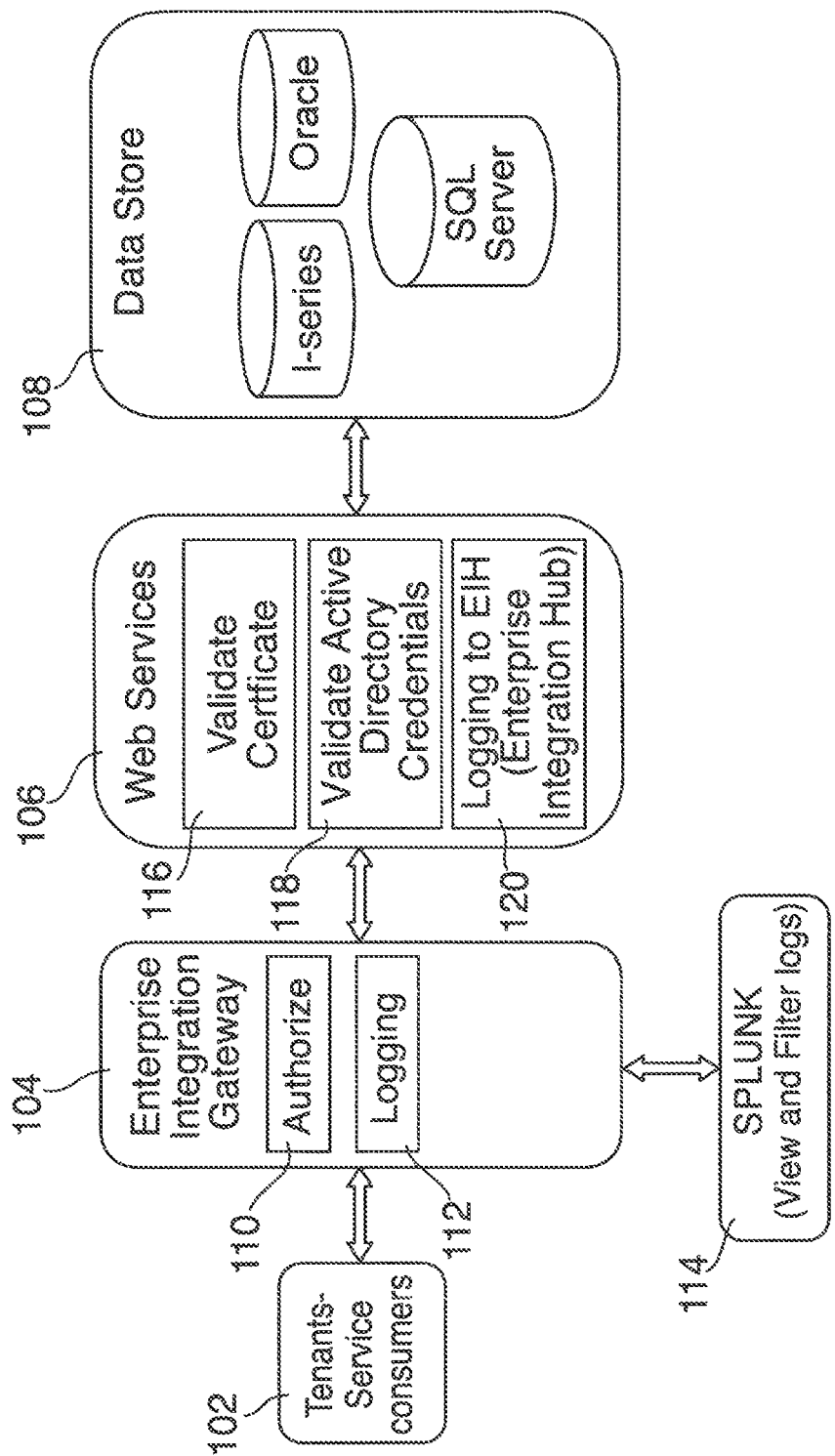
FIG. 1 shows a conventional mechanism for security in web services.

Some embodiments may involve a method for centralizing authentication, authorization and audit of user activity in a web services layer. The web services layer may be on a web server.

Web services may incorporate a second web services functionalities. A third party may provide the functionalities of the web services layer and the additional web services. The incorporation of the original web services and additional web services layer may now create a third bundled web services layer. The importance of centralizing the AAA at the web services layer is integral where several web services are incorporated together with the original web services layer.

The method may involve receiving a user ID, a password, and/or ID token, and a service request at the web services layer. The ID token may be registered with a Ping security token service ("STS").

In some embodiments, the Ping STS may be local to the web services layer on the web server and improve the speed of transmitting data.

In some embodiments, the Ping STS may be remote to the web services layer on the web server.

Through registering directly with Ping STS, the web services layer does not need to maintain user profiles for each consumer. The Ping STS may be in communication with the web services layer.

The web services layer may communicate the user ID, password, ID token, and/or service request to the Ping STS. In response to the Ping STS's receipt of the communication, the method may further involve using the Ping STS to generate a one-time security assertion markup language ("SAML") token. The SAML token may contain client identification and attributes for authorization of the service request and operation. On successful authentication of the user, the authorization may include either authorizing or denying user access to the requested service operation.

The SAML token may be transmitted to the web services layer. Upon retrieval of the SAML token with the previously-determined authorization incorporated within, the web services layer may either execute or deny access to the requested user operation.

The method may further involve logging a user's actions at the web services layer. The logging may further involve integrating a remote or third-party logging system with the web services layer. The logging system may enable searching and tracking of the user's actions.

Some embodiments involve a centralized architecture for authentication, authorization and audit of user activities within a web services layer. The centralized architecture for authentication, authorization and audit ("AAA") may be within the web services layer.

The web services layer may be configured to receive a user ID, a password and/or identification token ("ID"). The ID token may be located in a header of a communication from a user.

The mechanism may also include a Ping STS. The Ping STS generates a security assertion markup language ("SAML") token. The SAML token may be in certain embodiments, a one-time use("OTU") SAML token.

In certain embodiments the web services layer may receive the user ID, the password and/or the ID token via a header of a simple object access protocol ("SOAP") message. The web services layer may transmit the ID token to the Ping STS. The Ping STS may authenticate the SAML token corresponding to the user ID, password and/or security level associated with the user. The SAML token may also be transmitted back.

The mechanism may further include a central repository system ("CRS"). The CRS may maintain a directory of resources and levels of security required for accessing each resource. The web services layer may be configured to transmit the resource requested and information from the SAML token to the CRS. The CRS may confirm, based on security level as per the information from the SAML token, whether the resource request may be executed or denied.

In response to the previously-determined confirmation, the web services layer may be configured to either authorize or deny the requested resource. The authorization occurring at the web services layer may eliminate additional layers and only grant access to permitted operations.

The method may further involve logging a user's actions at the web services layer. The logging may further involve integrating a remote or third-party logging system with the web services layer. The logging system may enable searching and tracking of the user's actions.

Some embodiments may include preventing authentication bypass by a user for accessing the web services. The method may comprise integrating authentication of the user at the web services layer. The integration at the web services layer may in certain circumstances eliminate an additional layer of integration. The elimination of integration may enable creating one direct endpoint. The elimination of integration may further result in forcing an authorization check and thereby granting access to only permitted operations.

Illustrative embodiments of mechanism and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of mechanism and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Mechanisms and methods described herein are illustrative. Mechanisms and methods of the invention may involve some or all of the features of the illustrative mechanism and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows a conventional mechanism with additional layers of integration. Step 102 shows a user attempting to request a service via an enterprise integration gateway ("EIG") layer. The EIG layer 104 may be used for authorizing the user's service request 110 and logging the received calls shown at 112 with a logging service shown at 114.

Authorization of a user, as shown at 110 may require the user's identification and service request to be transmitted to the web services layer 106. The web services layer 106 may then transmit the user's identification and service request to the CRS/data store as shown at 108 for determination of authorization of a service request. The response may then be returned to the EIG layer via the web services layer and may either authorize or deny the requested service.

Logging 114 may only track those calls received at the EIG layer.

A user may be able to directly connect to the services without going through the EIG layer 104 for authorization 110 via a lower level and by using direct endpoints. This may increase the risk for access to all service operations without authorization of the service request. The EIG layer 104 may also increase the response time for processing a service request.

Authentication for the user, shown at 116, may be done at the web services layer 106. Web services layer 106 may need to maintain an active directory of user profiles shown at 118 to be able to authenticate a user. Maintenance of an active directory at the web services layer 106 may also increase the response time for processing service request Ping STS. SPLUNK 114 may only track and log calls received at the EIG layer 104. Logging shown at 120, may require logging to an enterprise integration hub. Logging 120 may only track and log calls received at the web services layer 106.

Web services teams may not have the ability to view, filter, or search the logs shown at 114 because this logging was done prior to calls received at the web services layer.

Figure 2:
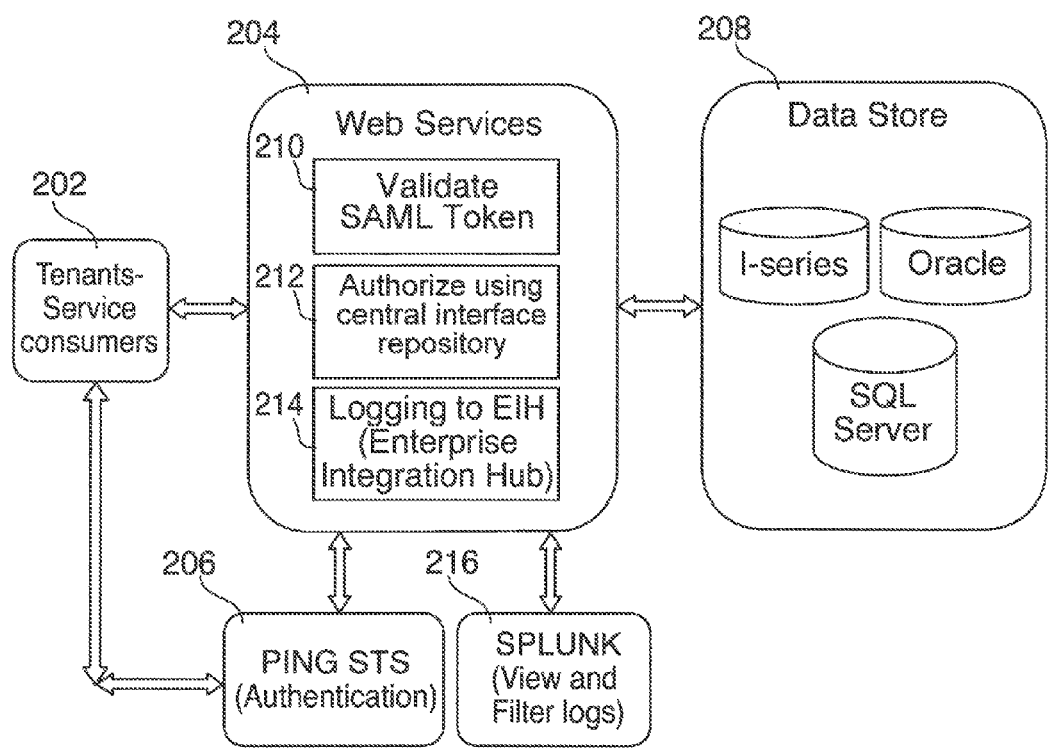
FIG. 2 shows an illustrative flow diagram in accordance with the principles of the invention.

FIG. 2 shows an illustrative flow diagram in accordance with the principles of the invention. Step 202 shows a user interacting with the web services layer to authorize a service request. A user shown at 202 may be registered with a Ping STS system shown at 206. The Ping STS 206 may, in response to receiving user login information, verify the user identification and generate a SAML token containing the user's identification information. The SAML token may be transmitted to the web services layer.

At step 204, the web services layer may receive the SAML token and may authenticate the user as shown at 212.

The web services layer 204 may also authorize the user request shown at 210. The authorization may include using a central repository system ("CRS") 208. Web services layer 204 may transmit the SAML token and service requested to the CRS 208. CRS 208 may determine permissibility for the service requested and return authorization for the service to the web services layer 204. Web services layer 204 may accept the authorization and may perform the service requested shown at 210. Alternatively, the CRS 208 may respond with a denial of the request.

Logging to enterprise integration hub, as shown at 214 may be logged with a logging system 216. All services and calls that may take place at the web services layer 204 and/or during transmittal of the identification information, may be included in the logging system 216. A web services team may have the ability to view, filter, search and track user actions shown at logging system 216.

FIG. 2 shows an illustrative flow diagram in accordance with the principles of the invention. Elements 302, 304, 306, 308, 310, 312, 314 and 316 correspond to elements 202, 204, 206, 208, 210, 212, 214 and 216 in FIG. 2.

Figure 3:
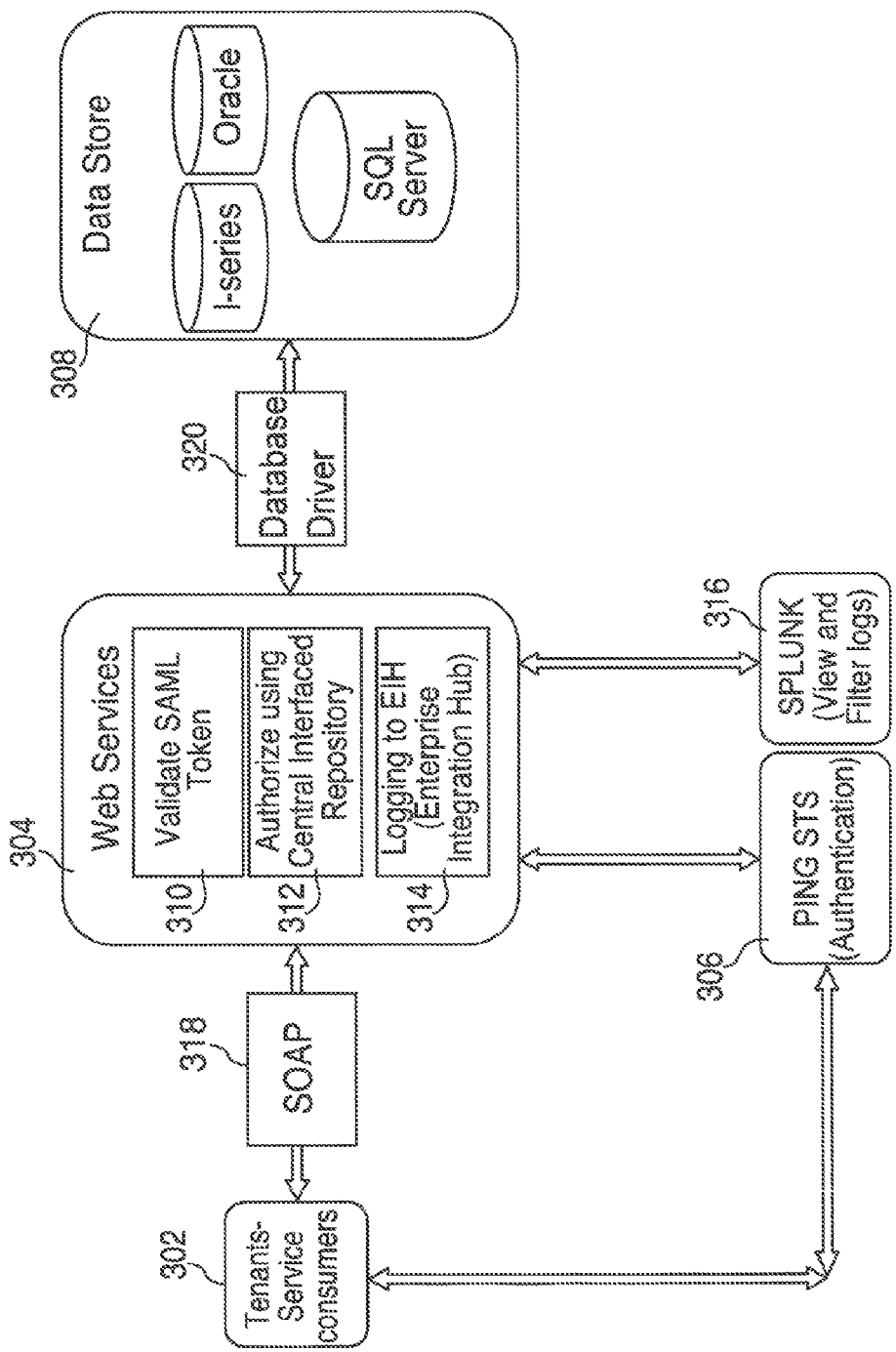
FIG. 3 shows an illustrative flow diagram in accordance with the principles of the invention.

In addition to what is shown in FIG. 2, FIG. 3 shows an additional step. User identification information may be transmitted to the web services layer via a header in a SOAP message shown at step 318.

At layer 304, the web services layer may receive the SAML token and may authenticate the user shown at 312.

The web services layer 304 may also authorize the user request shown at 310. The authorization may include using a central repository system ("CRS") 308. Web services layer 304 may transmit a SOAP message 320 to the CRS 308. SOAP message 320 may include the SAML token and service requested. CRS 308 may determine permissibility for the service requested and return authorization for the service via SOAP message 320. Web services layer 304 may accept the authorization and may perform the service requested shown at 310. Alternatively, the CRS 308 may respond with a denial of the request.

Figure 4:
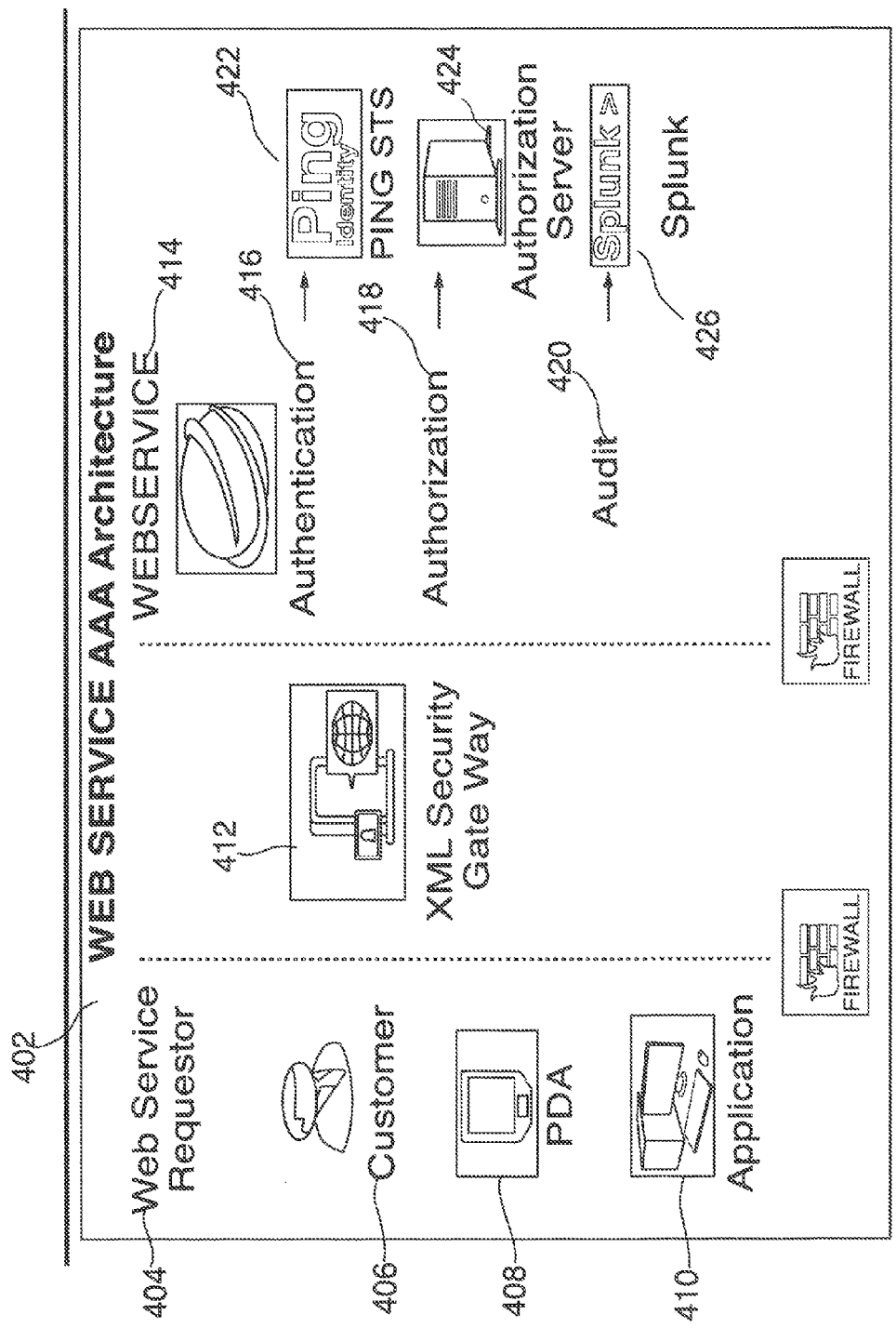
FIG. 4 shows an illustrative schematic of an overall design in accordance with the principles of the invention.

FIG. 4 shows an illustrative mechanism in accordance with the principles of the invention.

Step 402 shows a web services AAA architecture. A web services requestor 404 may be a customer/user as shown at 406. A web services requestor 404 may be a personal digital assistant ("PDA") as shown at 408. A web services requestor 404 may be an application as shown at 410.

An XML security gate way 412 may be a security protection between the web services requestor 404 and the web services layer 414.

A web services requestor 404 may need to be authenticated, authorized and audited. Authentication of a user, as shown at step 416, may take place at the web services layer. Authentication 416 may use Ping STS, as shown at step 422, to verify the identification of the web services requestor 404.

In certain embodiments, the Ping STS 422 may be local to the web services layer 414. In certain other embodiments, the Ping STS 422 may be remote to the web services layer 414.

When the web services layer 414 authenticates a user, the service requested may need to be authorized as shown at step 418.

Authorization 418 of a service requested may take place at the web services layer 414. Authorization 418 may use an authorization server 424 for determining permissibility of the web services requestor 404 for a service requested.

In certain embodiments, the authorization server 424 may be local to the web services layer. In certain other embodiments, the authorization server 424 may be remote to the web services layer 414.

All calls that take place at the web services requestor 404 and/or at the web services layer 414 may be audited and logged in SPLUNK or any other logging system, as shown at step 420, at the web services layer 414.

In certain embodiments, SPLUNK, or other logging system as shown at 426, may be local to the web services layer 414. In certain other embodiments, SPLUNK, or other logging system as shown at 426, may be remote to the web services layer 414.

Thus, systems and methods for centralizing the architecture for handling the AAA within the web services layer have been provided. Persons skilled in the art will appreciate that the present invention can be practiced by other than the described embodiments, which are presented for purposes of illustration rather than of limitation.

What is claimed is:

1. A method for centralizing authentication, authorization and audit ("AAA") of user activities within a web services layer, said web services layer comprising a web interface, the method comprising:

receiving at web services layer a user ID, a password, an ID token, said user ID, password, and ID token being registered with a Ping security token service ("STS");

using the Ping STS to generate a one-time security assertion markup language ("SAML") token, said SAML token expiring after a pre-determined time, said SAML token for enabling secure access to the web interface, said SAML token containing client identification and privilege level of user access to operations at said web services layer;

transmitting said SAML token to the web services layer;

verifying the SAML token, said verifying comprising authenticating the user at said web services layer;

upon authentication of the user, said web services layer authorizing requested user operations, said authorizing being based on a privilege level incorporated in said SAML token, said authorizing further comprising, transmitting said SAML token and operation requested to a central repository system ("C.R.S."), said web services layer confirming permissibility of the request with said C.R.S. and upon receiving confirmation from the C.R.S., executing the requested operation;

logging user actions at said web services layer, said logging, integrating with a logging system such that the logging system enables searching and tracking of said user actions.

2. The method of claim 1 wherein said ID token expires after a pre-determined time.

3. The method of claim 1 wherein the transmitting of the user ID, the password and/or the ID token to the web services layer comprises, transmitting using a simple object access protocol ("SOAP") message.

4. The method of claim 3 wherein the transmitting using the SOAP message comprises displaying said, user ID, said password and/or said ID token in the header of said SOAP message.

5. The method of claim 1 further comprising, wherein upon denial of said requested operation, notifying the user of denial at the web services layer and terminating said requested operation.

6. A method for centralizing authentication, authorization and audit ("AAA") of user activities within a web services layer, said web services layer comprising a web interface, the method comprising;
  receiving at web services layer a user ID, a password, an ID token and a service request, said user ID, password and ID token being registered with a Ping security token service ("STS");
  using the Ping STS to generate a one-time security assertion markup language ("SAML") token, said SAML token expiring after a pre-determined time, said SAML token for enabling secure access to the web interface, said SAML token containing client identification and authorization of the service request, said authorization either authorizing or denying whether said web services layer is authorized to provide the requested service;
  transmitting said SAML token to the web services layer;
  authenticating the SAML token, said authenticating comprising accepting the previously-determined authorization at the web services layer;
  upon receiving previously-determined authorization, said web services layer performing the requested user operation;
  logging user actions at said web services layer, said logging comprising integrating the web services layer with a logging system such that the logging system enables searching and tracking of said user actions.

7. The method of claim 6 wherein said ID token expires after a pre-determined time.

8. The method of claim 6 wherein the transmitting of the user ID, the password and/or the ID token to the web services layer comprises, transmitting using a simple object access protocol ("SOAP") message.

9. The method of claim 8 wherein the transmitting using the SOAP message comprises displaying said user ID, said password and/or said ID token in the header of said SOAP message.

10. The method of claim 6 further comprising, wherein upon the web services layer denying the requested service, notifying the user of denial at the web services layer and terminating said requested service.

11. A centralized architecture for authentication, authorization and audit of user activities within a web services layer mechanism, the architecture comprising:
  a web services layer which is configured to receive a user ID, a password and an identification token ("ID"), said ID token being located in a header of a communication from a user;
  a Ping security token service ("STS"), said Ping STS configured to generate a one-time use ("OTO") security assertion markup language ("SAML") token;
    wherein the web services layer, upon receipt of the user ID, the password and the ID token, transmits said user ID, said password and said ID token to the Ping STS and receives, in response, a Boolean value indicating the response from Ping STS for authenticating the said user; said SAML token enabling the web services layer to authenticate a user;
  a central repository system ("CRS"), wherein, the web services layer is configured to transmit the resource requested and information from the SAML token to the CRS, said CRS to confirm, based on security level stored in the SAML token, permissibility of the request, said confirmation enabling the web services layer to either execute or deny the requested operation; and
  a user activity logging system, wherein the web services layer transmits a record of user activities to the logging system, said logging that enables searching and tracking of user activities.

12. The method of claim 11 further comprises said ID token expiring after a pre-determined time.

13. The method of claim 11 further comprises said SAML token expiring after a pre-determined time.

14. The method of claim 11 wherein transmission of the SOAP message comprises transmitting using a simple object access protocol ("SOAP") message.

15. The method of claim 14 wherein transmission using the SOAP message comprises displaying the SAML token in the header of the SOAP message.

16. A mechanism for consolidating communications between a computer tenant and a web services layer, said mechanism comprising:
  the web services layer, said web services layer configured to:
    receive communications, via an authentication validation module, from an authentication service, said authentication service in communication with the computer tenant and the web services layer;
    receive authorization data, via an authorization module, from an authorization data store, said authorization data store maintaining computer tenant authorization data;
    receive and transmit logged calls from a log database, said logged calls configured to store calls from the computer tenant to the web services layer and calls from the web services layer to the authentication server;
  wherein:
    when a computer tenant attempts to initiate communication with the web services layer, the computer tenant is configured to transmit the user id and password to Ping STS and get the token to the web services layer;
    upon receipt, by the web services layer, of the token and the initiation attempt, the web services layer is configured to validate the token: and
    upon validation of the token, the web services layer authenticates the computer tenant, said SAML token enabling the user to authenticate itself within the web services layer.

17. The mechanism of claim 16, wherein the initiation attempt further includes an authorization request, said authorization request comprising a service request from the computer tenant.

18. The mechanism of claim 17, wherein upon receipt of the authorization request, the web services layer transmits requested information included in the service request.

19. The mechanism of claim 17, wherein upon receipt of the authorization request, the web services layer transmits authorization for requested information included in the service request.

* * * * *